United States Patent [19]

Schui et al.

[11] Patent Number: 4,719,292

[45] Date of Patent: Jan. 12, 1988

[54] β-MODIFIED CRYSTALLINE RED PIGMENT

[75] Inventors: Franz Schui, Frankfurt am Main; Reinhold Deubel, Soden am Taunus; Norbert Wester, Hofheim am Taunus, all of Fed. Rep. of Germany

[73] Assignee: Hoechst Aktiengesellschaft, Frankfurt am Main, Fed. Rep. of Germany

[21] Appl. No.: 507,720

[22] Filed: Jun. 23, 1983

[30] Foreign Application Priority Data

Jun. 26, 1982 [DE] Fed. Rep. of Germany ..... 32223888

[51] Int. Cl.$^4$ .................. C09B 67/24; C09B 67/48; C09B 11/02; D06P 1/44
[52] U.S. Cl. ..................... 534/575; 106/22; 106/23; 106/208; 106/308 Q; 106/289; 534/588; 534/602; 534/882
[58] Field of Search ................ 260/197, 208, 144 P; 534/575, 688, 602, 882

[56] References Cited

U.S. PATENT DOCUMENTS

| | | | |
|---|---|---|---|
| 733,280 | 7/1903 | Schirmacher | 260/197 |
| 2,754,294 | 7/1956 | Hein et al. | 260/197 |
| 2,796,415 | 6/1957 | Ludwig et al. | 260/197 |
| 3,137,686 | 6/1964 | Dietz et al. | 260/157 |
| 3,642,768 | 2/1972 | Ribka . | |
| 3,660,375 | 5/1972 | Erhardt et al. | 260/208 X |
| 3,928,315 | 12/1975 | Ribua | 260/204 |
| 3,956,270 | 5/1976 | Von Rombach et al. | 260/208 X |
| 3,974,136 | 8/1976 | Hunger et al. | 260/176 |
| 3,980,635 | 9/1976 | Hunger et al. | 268/161 |
| 4,100,157 | 7/1978 | Muller et al. | 260/208 X |
| 4,327,999 | 5/1982 | Koller et al. | 260/208 X |

FOREIGN PATENT DOCUMENTS 1228731 11/1966 Fed. Rep. of Germany .

OTHER PUBLICATIONS

Biedermann, J. Soc. Dyers & Colourists, vol. 87, pp. 105 to 111 (1971).
Colour Index, 3rd ed., vol. 4, p. 4079, #15585:1(1971).
Kirk-Othmer, Enc. of Chem. Tech., 3rd Ed., vol. 17 (1982), pp. 845 to 846.

*Primary Examiner*—Floyd D. Higel
*Attorney, Agent, or Firm*—Connolly & Hutz

[57] ABSTRACT

A novel crystallographic modification (β-modification) of the pigment C. I. Pigment Red 53:1 is described and claimed which has characteristic reflection values in its X-ray diffraction pattern obtained by means of Cu-K$_\alpha$ radiation. This novel pigment form is obtained by reacting an aqueous solution of an alkali metal or ammonium salt of the formula 1

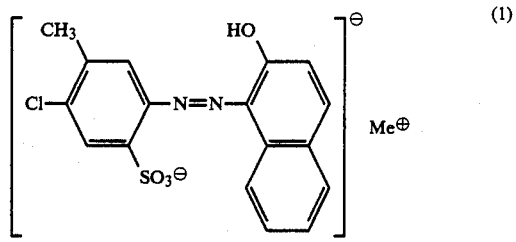

with the equivalent amount of a water-soluble barium salt in the presence of a compound of the formula 2

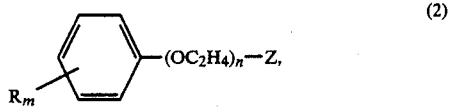

The modification is distinguished by a more yellowish-red shade as compared to the known α-modification.

4 Claims, No Drawings

β-MODIFIED CRYSTALLINE RED PIGMENT

The invention provides a novel crystallographic modification (β-modification) of the following pigment

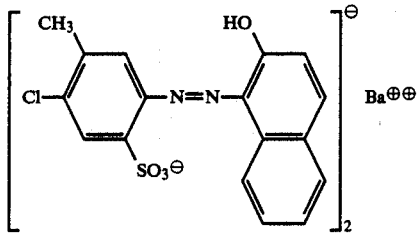

The commercial products of this C.I. Pigment Red 53:1 known hitherto have the α-modification. The X-ray diffraction pattern of this known modification, obtained by means of Cu-K$_α$ radiation has the following characteristic reflection values (relative intensity depending on the glancing angle $θ$):

| °$θ$: | 2.52 | 2.79 | 3.58 | 5.12 | 5.68 | 6.28 | 7.17 | 7.53 | 8.17 |
|---|---|---|---|---|---|---|---|---|---|
| rel.int.: | 100 | 99 | 19 | 13 | 9 | 10 | 8 | 11 | 16 |
| °$θ$: | 10.05 | 10.37 | 11.40 | 12.20 | 13.00 | 13.22 | 14.47 | | |
| rel.int.: | 10 | 13 | 13 | 11 | 16 | 16 | 7 | | |

A novel modification (β-modification) of C.I. Pigment Red 53:1 has now been found the X-ray diffraction plattern of which obtained by means of Cu-K$_{60}$ radiation has the following characteristic reflection values (relative intensity depending on the glancing angle $θ$):

| °$θ$: | 2.41 | 3.41 | 3.83 | 5.43 | 6.20 | 6.90 | 7.08 | 7.30 | 7.68 |
|---|---|---|---|---|---|---|---|---|---|
| rel.int.: | 100 | 16 | 16 | 10 | 12 | 6 | 9 | 6 | 2 |
| °$θ$: | 8.17 | 8.62 | 9.25 | 9.77 | 10.48 | 10.92 | 12.22 | 12.48 | |
| rel.int.: | 2 | 9 | 4 | 9 | 9 | 8 | 14 | 11 | |

The pigment form of the invention is distinguished by a considerably intensified yellow shade. The fastness properties correspond to those of the α-modification.

The novel pigment form is obtained by reacting an aqueous solution or, preferably, aqueous suspension of the salt of the formula 1

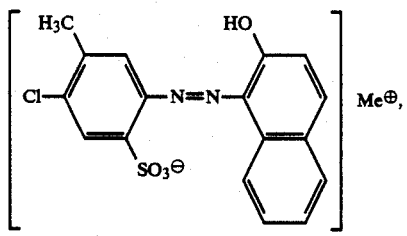

in which Me is an alkali metal or ammonium, in the presence of from 6 to 12, preferably 8 to 10, % of a compound of the formula 2

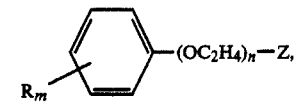

in which
R represents identical or different alkyl radicals having 1 to 12 carbon atoms,
m is 2 or 3,
n is an integer of from 1 to 50, preferably 6 to 12, and
Z is —OH,

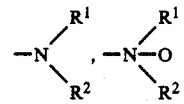

($R^1$ and $R^2$ each being alkyl having from 1 to 4, preferably 1 or 2, carbon atoms),
with a water-soluble inorganic or organic barium salt, preferably barium chloride.

The barium salt is preferably used in an excess of from 20 to 40%.

An especially suitable laking agent is 2,4,6-triisobutylphenyl-(hexa- to dodeca)-oxethyldimethyl- or -diethylamine. Favorable laking conditions are in a pH range of from 5 to 10, preferably 8 to 9, and in a temperature range of from 10° to 100°, preferably 50° to 90° C.

Although the coupling conditions such as temperature, concentration, pH etc. have a certain influence on the color, they are not critical according to the invention.

As tertiary amine, 2,4,6-triisobutylphenyl-(hexa- to dodeca)-oxethyldimethyl- or -diethylamine or nonylphenyl(hexa- to dodeca)-oxethyldimethyl- or -diethylamine are especially suitable.

The novel pigment form is suitable for pigmenting varnishes and plastic materials, and for the manufacture of printing inks and aqueous pigment preparations. Yellowish-red dyeings are obtained.

The barium salt is advantageously added at room temperature in the form of an aqueous solution. After the precipitation, the batch is heated to elevated temperature, and stirred at this temperature for a certain time, the pigment is filtered, washed free from salt with water, and then dried.

In the following examples parts and percentages are by weight.

EXAMPLE 1

33.2 Parts of 1-amino-3-methyl-4-chlorobenzene-6-sulfonic acid were stirred with 350 parts of water and 22.4 parts of 31% hydrochloric acid, and diazotized at 10°–15° C. with 25.9 parts of a 40% aqueous sodium nitrite solution. 22.0 Parts of β-naphthol were dissolved in 150 parts of water and 22.4 parts of 33% sodium hydroxide solution, and this solution was poured within 1 hour into the diazo suspension. The pH was adjusted to 9. After addition of 5 parts of 2,4,6-triisobutylphenyl-octaoxethyl-dimethylamine and 27 parts of barium chloride.2 H$_2$O (in the form of an aqueous 19% solution), the batch was heated to 85° C., stirred at this temperature for 20 minutes, filtered, washed with water until free from salt, and dried at 70° C.

71 Parts of a yellowish-red pigment (color lake) were obtained, which pigment has the β-crystal modification of the invention characterized by the above-mentioned X-ray diffraction pattern.

EXAMPLE 2

A solution of 6 parts of triisobutylphenol+13 EO in 54 ml of water was added at 20°-25° C. to an aqueous suspension of 59.2 parts of the dyestuff sodium salt prepared in known manner by diazotization and coupling from 1-amino-3-methyl-4-chlorobenzene-6-sulfonic acid and β-naphthol. The batch was heated to 80° C., and a solution of 27 parts of barium chloride.2 H$_2$O in 130 ml of water was added. Stirring was continued for 30 minutes at 80° C., the batch was filtered, washed free from salt using water, and dried at 70° C. 70 Parts of a yellowish-red pigment (color lake) were obtained which has the β-crystal modification of the invention characterized by the above X-ray diffraction pattern.

EXAMPLES 3 TO 10

The operation of Example 1 was repeated; however, instead of 5 parts of triisobutylphenyl-octaoxethyl-dimethylamine there were used
3: 5 parts triisobutylphenyl-octaoxethyl-diethylamine
4: 5 parts triisobutylphenyl-octaoxethyl-dibutylamine
5: 5 parts triisobutylphenyl-octaoxethyl-dimethylamine oxide
6: 5 parts ®Sapogenat T 500 (triisobutylphenyl+50 EO)
7: 5 parts dinonylphenol+9.5 EO
8: 5 parts dinonylphenol-nonaoxethyl-dimethylamine
9: 5 parts dibutylphenol+12 EO
10: 5 parts dibutylphenol-dodecaoxethyl-diethylamine.

From 67 to 71 parts each of a yellowish-red pigment (color lake) were obtained, which has the β-crystal modification of the invention characterized by the above X-ray diffraction pattern.

What is claimed is:

1. Crystal modification (β-modification) of C.I. Pigment Red 53:1 the X-ray diffraction plattern of which obtained by means of Cu-K$_\alpha$ radiation has the following characteristic reflection values (relative intensity depending on the glancing angle θ):

| °θ: | 2.41 | 3.41 | 3.83 | 5.42 | 6.20 | 6.90 | 7.08 | 7.30 | 7.68 |
|---|---|---|---|---|---|---|---|---|---|
| rel. int.: | 100 | 16 | 16 | 10 | 12 | 6 | 9 | 6 | 2 |

| °θ: | 8.17 | 8.62 | 9.25 | 9.77 | 10.48 | 10.92 | 12.22 | 12.48 |
|---|---|---|---|---|---|---|---|---|
| rel. int.: | 2 | 9 | 4 | 9 | 9 | 8 | 14 | 11 |

2. A process for the preparation of the modification (β-modification) of C.I. Pigment Red 53:1 as claimed in claim 1, which comprises reacting an aqueous solution or aqueous suspension of the salt of the formula 1

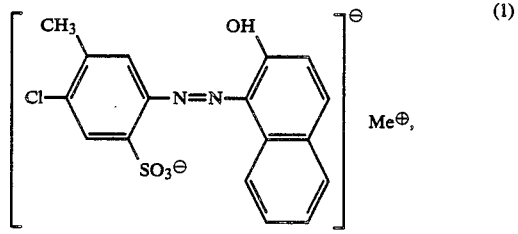

in which Me is an alkali metal or ammonium, in the presence of a compound of the formula 2

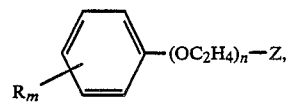

in which
R represents identical or different alkyl radicals having 1 to 12 carbon atoms,
m is 2 or 3,
n is an integer of from 1 to 50, and
Z is —OH,

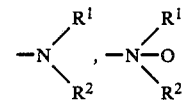

(R$^1$ and R$^2$ each being alkyl having from 1 to 4 carbon atoms), with an excess of a water-soluble barium salt.

3. The process as claimed in claim 2, which comprises reacting an aqueous suspension of the salt of the formula 1

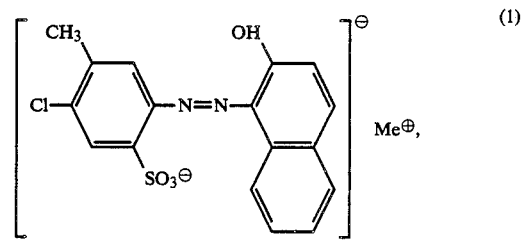

in which Me is sodium, potassium or ammonium in the presence of a compound of the formula 2

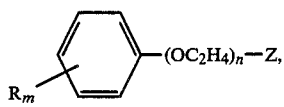

in which
R represents identical or different alkyl radicals having 1 to 12 carbon atoms,
m is 2 or 3,
n is an integer of from 1 to 50, and
Z is —OH,

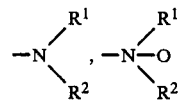

(R$^1$ and R$^2$ each being alkyl having from 1 to 4 carbon atoms), with an excess of a water-soluble barium salt.

4. The process as claimed in claim 2, which comprises using 2,4,6-triisobutylphenyl-octaoxethyl-dimethylamine as compound of the formula 2.

* * * * *